United States Patent Office 3,402,520
Patented Sept. 24, 1968

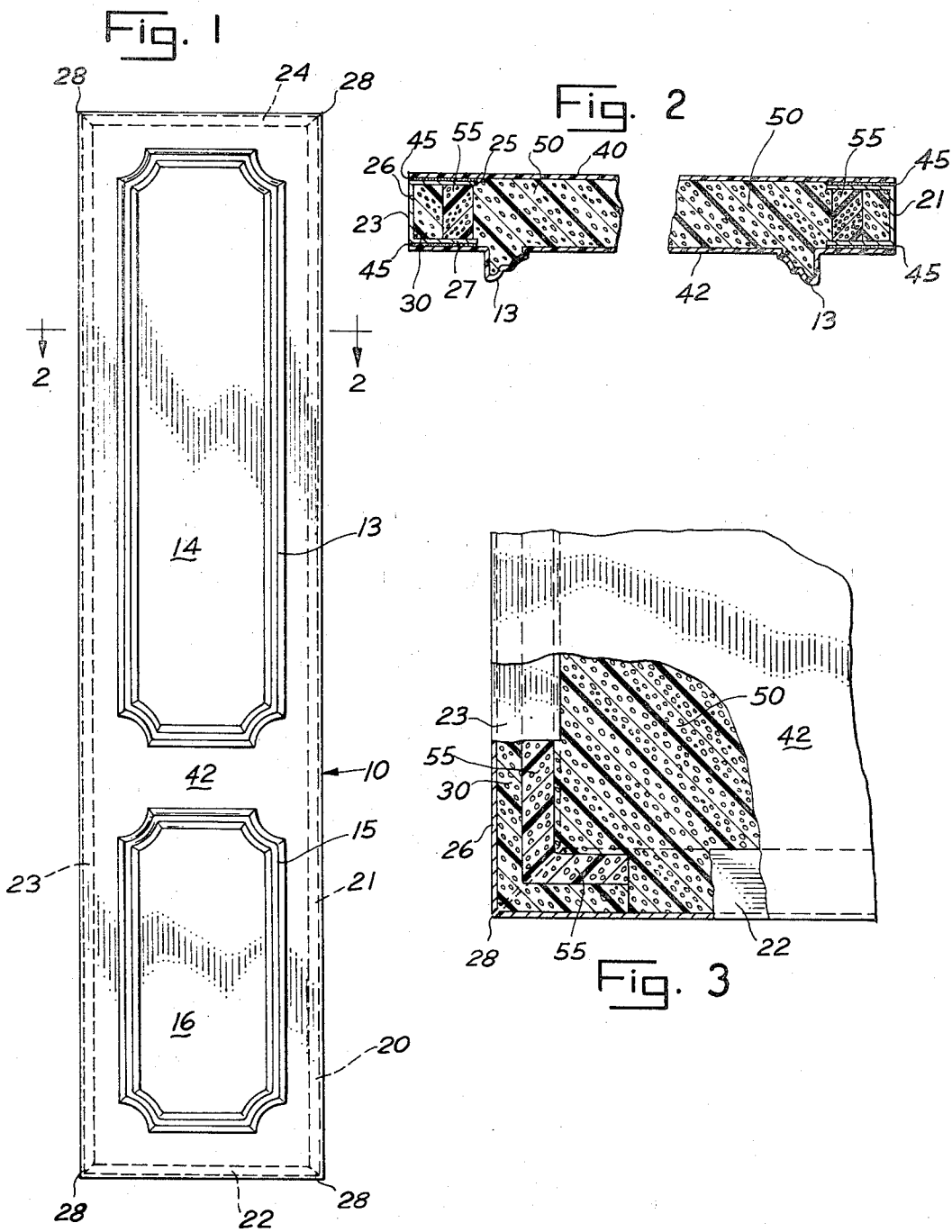

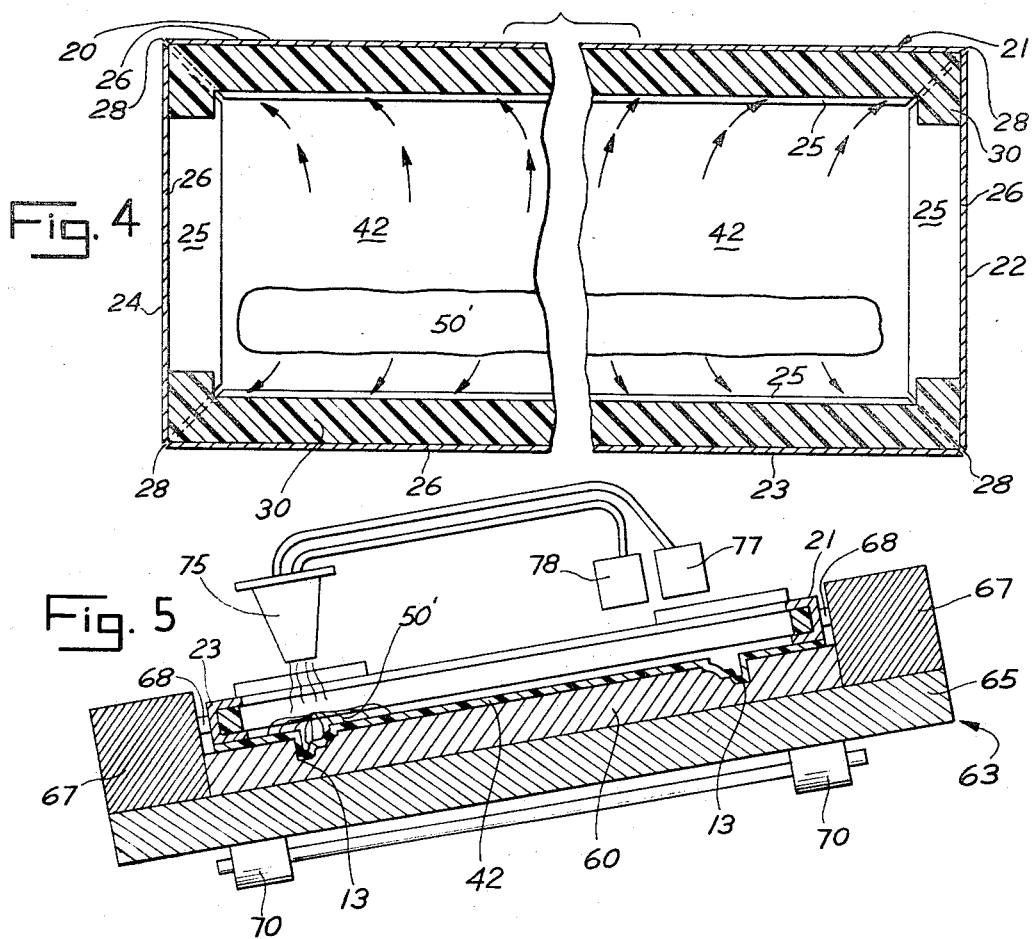

3,402,520
PANEL WITH FOAMED-IN-PLACE CORE
Albert M. Lee and Herbert S. Hinrichs, Peoria, Ill., assignors to Home Comfort Products Co., Princeville, Ill., a corporation of Illinois
Filed Dec. 23, 1966, Ser. No. 604,246
18 Claims. (Cl. 52—309)

ABSTRACT OF THE DISCLOSURE

A lightweight panel having relatively thin surface skins adhered on opposite sides of a stiff frame outline, thereby enclosing the panel interior which is filled with a foamed-in-place core of a low density and relatively rigid plastic foam. A strip of pervious and flexible material lines an inside length of the frame and communicates with vents through the frame. During the formation of the core, excess gas may escape along the strip and through the vents to allow an even, uniform expansion of the core. A portion of the strip and core unite to form a high density stratum therealong, which reinforces the panel and interlocks the core thereto. Preferably, during the formation of the core, the panel is confined between mold plates which are transversely canted at approximately a 10° angle, the raw foam core having been previously applied in a longitudinal row below the longitudinal centerline of the panel. Thus, expansion of the core is mainly in an upward direction, and below the excess gases, which are free to escape upwardly through the strip and out the vents.

Background of the invention

This invention relates generally to a lightweight rigid panel having a low density plastic foam core, and more particularly, to a panel fabricated with a foamed-in-place core.

In the past, panels having thin outer surface skins and low density cores of a plastic foam were fabricated by bonding the skins to a preformed core. Foamed-in-place cores were found to be unsatisfactory because entrapped gas pockets and/or uneven expansion of the core during formation caused unsightly buckles and depressions in the thin surface skins. The mere provision of vents was not sufficient because an uneven core expansion often entrapped a pocket of gas, for instance, by plugging a vent. A limited solution has been proposed by patent application Ser. No. 527,571, filed Feb. 15, 1966, by Lester L. Smith and Frank E. Randall. There the surface skins were expanded by preheating in order that they stretch taut and smooth upon cooling after formation of the core. Although satisfactory panels can be produced by this method, a percentage of reject panels also occurs because the taut skins are unable, in every case, to compensate for extreme depressions and buckles.

Summary of the invention

Therefore, to overcome the foregoing and other difficulties of the prior art, the general object of this invention is to provide a new and improved panel with foamed-in-place core. To this end, the present invention teaches lining inside lengths of the frame with a strip of gas pervious material in communication with one or more vents. The strip provides an escape passageway to the vents and also prevents clogging of a vent by extrusion of the core material therethrough. The strip is also flexible and compressible to compensate for uneven, excessive, and deficient core expansion. Preferably, the unexpanded raw foam is applied in a row along a lower length of the panel which is confined between mold plates transversely canted at approximately 10°. In this manner, the core expansion will be mainly in an upward direction, forcing excess gas ahead of it. Furthermore, a portion of the strip and core unite to form a high density stratum which reinforces the panel and interlocks the core thereto.

Thus, one of the objects of this invention is to promote an even and uniform expansion of a foamed-in-place panel core by elimination of entrapped gas pockets.

It is an object of this invention to eliminate unsightly buckles and depressions in panel surface skins.

Another object of this invention is to provide a method of satisfactorily and economically fabricating panels having foamed-in-place cores.

It is still another object to provide a durable, lightweight, and rigid panel which is economical to produce by utilizing a minimum of conventional, currently available materials that lend themselves to standard mass-production manufacturing techniques.

Yet another object is to provide a structure and method of fabrication for panels and the like, embodying a frame for strength and rigidity, heat pliable and resistant plastic surface skins which may be embossed for appearance, and a low density core which conforms intimately to the interior configurations of the plastic surface skins.

It is also an object of this invention to provide a high density stratum along the core which reinforces the panel and interlocks the core therein.

Further and other objects, and a more complete understanding of the invention may be had by referring to the following description and claims, taken in conjunction with the accompanying drawings.

Description of the drawings

For the purpose of illustrating the invention, there is shown in the drawings a form which is presently preferred, it being understood, however, that this invention is not necessarily limited to the precise arrangements and instrumentalities there shown.

FIG. 1 is a front elevational view of the panel embodying a preferred form of the invention made by a preferred method;

FIG. 2 is an enlarged and broken sectional view taken along line 2—2 and in the direction of the arrows of FIG. 1;

FIG. 3 is an enlarged fragmentary sectional view of a corner of FIG. 1;

FIG. 4 is a diagrammatic partial plan view of a panel illustrating the placement of raw foam, the direction of core expansion, and escape of excess gas.

FIG. 5 is a diagrammatic end sectional view of the panel and a typical mold apparatus used in fabrication of the panel.

FIG. 6 is a diagrammatic end sectional view of the panel and mold apparatus during expansion and curing of the core.

Description of the preferred embodiment

Referring now to the drawings in detail, wherein like numerals indicate like elements, there is shown in FIG. 1, an illustration of a panel of the present invention designated generally at 10. As illustrated, depending upon the use and the ornamentation desired, one or both of the sides may have an integrally formed embossed surface design 13 and 15 to form, as exemplified in FIG. 1, typical ornamented panel areas 14 and 16. It is, of course, understood that innumerable variations may be made in the types and details of designs used for such ornamentations.

A frame outline 20 of the panel, shown in dashed lines at FIG. 1, is formed by longitudinal lengths 21, 23 and transverse lengths 22, 24 of a U-shaped channel member. As shown, the channel lengths 21–24 have mitered ends and form the rectangular outline of the panel 10. Naturally, many shapes other than rectangular are conceivable, e.g., oval, square, hexagonal, etc., and therefore the invented panel herein may be any of a variety of outline shapes. The U-shaped channel lengths have inwardly directed flanges 25, 27 and an interconnecting web 26 which corresponds to the peripheral edge of the panel 10, as may be seen by reference to FIGURES 2, 3 and 4. The channel lengths 21–24 may be of any suitably stiff material such as plastic, or steel; however, a lightweight aluminum has been found to be very satisfactory. The enlarged fragmental view of a panel corner, provided by FIG. 3, shows that the mitered ends of adjoining channel lengths may be spaced slightly to provide a vent 28 at each corner of the panel 10.

A strip of gas pervious material 30 lines the entire inside length of the longitudinal channel members 21, 23 and bridges across the vent 28 at the corners to partially line a short portion of the transverse channel members 22, 24, as may be best visualized with reference to FIGS. 3 and 4. The strip 30 is a relatively flexible and compressible open cell plastic foam of a dimension to fit exactly within the U-shaped channel between the inward flanges 25, 27 and against the interconnecting web 26. Preferably, the material of the strip should be chosen of a relatively uniform and minute celled foam type. For example, a resilient polyurethane foam obtained as a reaction product of organic materials having two or more active hydrogen groups such as derived from hydroxyl, amine, amide, etc. and an organic polyisocyanate. In addition, auxiliary agents such as silicones, catalyst, water, and inert blowing agents are used to promote the chemical reaction, control the cellular structure of the foam, and to expand the mass during the reaction. Since the strip bridges across the panel corners at the mitered ends of adjoining channel members, it is in communication with each of the vents 28.

A pair of durable and relatively thin surface skins 40, 42 are bonded by a suitable adhesive 45 to opposite outer sides of the frame 20 on respective of the inward flanges 25, 27. As shown in the drawings, the skins 40, 42 are trimmed to correspond to the outline of the panel and are spaced apart by webs 26 to define the outer faces of the panel 10. Any suitable material, such as a sheet metal, may be used for the skins 40, 42; however, a heat formable type of sheet plastic material is preferable because of the ease in forming an embossed surface design therein. As an example, for this purpose acrylonitrile butadiene styrene has been found to be an excellent material.

A low density core 50 of a relatively rigid plastic foam completely fills the interior of the panel 10. The core 50 may be formed of an available foam plastic, for example, a relatively rigid cellular urethane. The core 50 is foamed-in-place, that is, expanded to fill the entire interior of the panel 10. During the formation of core 50, a portion of the raw foam and the strip of gas pervious material 30 unite and harden to form a high density stratum 55. Depending on the types of plastic foam chosen for the strip 30 and core 50, the stratum 55 may be a chemical union. As core 50 cures, it laminates itself to the inside of skins 40, 42 and to the inside of the flanges 25, 27 and interconnecting webs 26 of the channel lengths 22, 24. The hardened stratum 55 reinforces the panel 10 and interlocks the core 50 to the longitudinal lengths 21, 23. Thus, although preferable, it is not always necessary to utilize an adhesive 45 between the frame 20 and skins 40, 42, the lamination of the cured core being sufficient in most cases to provide a solid, uniform, laminated panel structure.

The strip 30 of gas pervious material, being an open cell plastic foam, absorbs some of the contiguous raw and expending core foam at a uniform rate. The uniformity of absorption through the relatively uniform and minute cells of strip 30 is such, in fact, that upon hardening, the high density stratum 55 is found to be well-defined, having almost perfectly true and straight edges. Furthermore, as the strip 30 is flexible and compressible, it compensates for uneven, excessive and deficient core expansion. The remainder of the strip 30, slightly compressed between the web 26 and stratum 55, always remains open to provide an escape passageway for excess gas to the vents 28. The strip 30 prevents clogging of vents 28 by extrusion of core foam therethrough. In addition to reinforcing and interlocking the core 50, the stratum 55 has been also found to provide an excellent backing or bed for fasteners through the web 26. That is, for example, whenever it is desirable to affix hinges, or like hardware, at the edge of a panel, the same may be securely attached by means of machine screws (not shown) through web 26 and anchored in the high density stratum 55.

The preferred method of fabricating the invented panel is described in conjunction with the diagrams of FIGS. 4, 5 and 6. If it is desired to utilize the steps of preheating and expanding the surface skins 40, 42, reference as to the specifics of those steps and details of apparatus therefor should be made to the aforementioned co-pending patent application. Furthermore, if a design is embossed in one of the surface skins, a correspondingly formed mold plate is required, for example, the bottom mold plate 60 shown in FIGS. 5 and 6. The bottom mold plate 60 is secured within a typical mold jig 63 provided by the base plate 65 and locator blocks 67. The locator blocks 67 are spaced at strategic positions along the base 65 for reception of the bottom mold plate 60, as shown. Studs 68 project from the inside of locator blocks 67 to abut at spaced positions against the web 26 of each of the channel members and thereby assure a correct placement and alignment of the frame 20. It is to be noted that the mold jig 63 is canted transversely at approximately a 10° angle. Also note that the mold base 65 may travel on rollers 70, so that the entire mold jig 63 and panel 10 therein may be easily displaced in a longitudinal direction. A nozzle 75 for application of raw, unexpanded foam, is located directly over bottom mold plate 60. As is well known, the reacting components composing the foam are fed from separate sources 77, 78 through conduits to the nozzle 75 in a predetermined amount. The nozzle 75 is positioned to place raw, unexpanded foam at points below the longitudinal centerline of the panel. However, if the panel has a deep design portion, the placement of raw foam should be in the deep design portion along a longitudinal row thereof. In some cases, depending on the design, particularly deeper designs, it may sometimes be necessary that foam placement be in those deeper portions both above and below the longitudinal centerline of the panel.

The preferred method of fabricating the panel is described herein only in a general sense, since improved and refined versions of the mold, jig and nozzle apparatus are to be expected, depending on the particular panel and application desired. First the surface skins 40, 42 are prepared, in that they may have a surface design 13, 15 embossed therein, and/or they may be expanded by preheating. In the example shown, an embossed surface skin 42 is placed on the bottom mold plate 60, which is shaped to conform intimately to the desired final shape of the surface skin 42. Preferably, an adhesive is applied to the outside surfaces of the inwardly directed flanges 25, 27 of the channel members 21–24, and the frame 20 is assembled on the skin 42 and within the mold jig. The web members 26 of each channel member abut against the studs 68 to assure proper alignment in assembly thereof. The longitudinal lengths 21, 23 are then lined along their entire lengths with a strip of gas pervious material 30 which completely fills between the flanges 25, 27 and abuts against the inner surface of webs 26. As shown best in FIGS. 3 and 4, the strip 30 bridges around the mitered corners of frame 20 across the vents 28 to also partially line a short length of the mitered ends of channel members 22, 24. Then a predetermined amount of unexpanded raw foam 50' is applied in a row along a length of the panel in a single pass. That is, the raw foam 50' is applied by nozzle 75 as the mold jig 63 and panel travel past, in an even row along a lower length of the panel to form the pattern as shown in FIG. 4. It is preferable that placement of the raw foam 50' be in the deeper portions of the design and in a row below the longitudinal centerline of the panel. Then a surface skin 40 is placed on the opposite flanges 25 of the frame 20 and a heavy top mold plate 80 placed thereon. A handle 85, or the like, may be provided for easy application and removal of the top mold plate 80. The panel 10 is confined between the mold plates 60, 80 and the studs 68, thereby maintaining the frame 20 and skins 40, 42 at desired dispositions during formation and cure of the core 50. It is understood that the plastic foam core may be of the type which generates some heat by itself, by and during the curing reaction, and it could expand and cure by that heat alone at a reasonable room temperature. Naturally, application of heat to the assembly for a predetermined period of time speeds the curing reaction. Thus, heat is applied and the raw core 50 is expanded and cured to fill the interior of panel 10. The expansion is mainly up the 10° transverse incline, forcing out excess gas ahead of it through the uppermost strip 30 and vents 28. Upon contact of the raw core 50' with the strip 30, the raw core filler material 50' is absorbed by the strip at a slow uniform rate. If expansion is uneven, excessive, or deficient, strip 30 accommodates therefore by flexing and compressing slightly. Upon hardening, a high density stratum 55 is formed along the strip 30 to reinforce the panel and interlock the core 50 to the frame 20. After full expansion and curing of the core 50, the core is laminated to the inside of the skins 40, 42 and against the frame 20, to provide a solid uniform panel structure.

The present invention may be embodied in other specific forms without departing from the spirit or potential attributes thereof and, accordingly, reference should be made to the appended claims, rather than to the foregoing specification as indicating the scope of the invention.

We claim:

1. A panel structure comprising, in combination; a frame outline of said panel including a vent therethrough; a strip of gas pervious material in communication with said vent, said strip lining an inside length of said frame; a pair of durable and relatively thin surface skins having margins adhered on opposite surfaces of said frame to define spaced outer faces of said panel; and a low density core of a relatively rigid foam formed in placed to fill the interior of said panel, said core thereby laminated to said skins and frame, and also united with some of said gas pervious material of said strip in a relatively hard, high density stratum therealong reinforcing said frame and interlocking said core thereto, the remainder of said gas pervious material providing a communicating passageway to said vent through said strip between said stratum and frame.

2. A panel structure in accordance with claim 1, wherein said gas pervious material of said strip is a relatively flexible and open cell foam, said remainder thereof being somewhat compressed between said stratum and frame during formation in place of said core.

3. A panel structure in accordance with claim 1, wherein one of said skins is a heat formable type of sheet plastic material having an embossed surface design formed thereon.

4. A panel structure in accordance with claim 3, wherein said one of said skins is of acrylonitrile butadiene styrene, said gas pervious material of said strip being of a relatively flexible and compressible plastic foam and said core being of a relatively rigid cellular urethane.

5. A panel structure in accordance with claim 4, wherein said high density stratum along said strip is a chemical union of said core and strip formed during formation in place of said core.

6. A panel structure in accordance with claim 1, wherein said frame is a channel of U-shaped cross-section having inwardly disposed flanges with an interconnecting web therebetween defining the edge of said outline, said strip being contained within said frame against said web and between said flanges.

7. A panel structure in accordance with claim 6, wherein said outline is rectangular, said frame being lengths of metal channel, and said vent being provided at a corner of said outline by a space between said lengths.

8. A panel structure in accordance with claim 7, wherein said strip of gas pervious material bridges around said corner along two of said lengths to completely separate said vent from said core and thereby prevent extrusion of core material through said vent during formation thereof.

9. A panel structure in accordance with claim 8, wherein said frame is composed by four of said lengths mitered at the ends thereof to form corners of said outline, said vent being provided by a space between adjoining of said lengths at said webs thereof.

10. A panel structure in accordance with claim 9, wherein said frame is composed by a pair of longitudinal and a pair of transverse lengths with a vent at each of said corners thereof, said strip being one of two, each entirely lining one of said longitudinal lengths and bridging around said corners to only partially line said transverse lengths, respectively.

11. A panel structure in accordance with claim 10, wherein said gas pervious material is a relatively flexible foam, said remainder thereof being somewhat compressed between said stratum and web during formation in place of said core, one of said skins being a heat formable type of plastic with an embossed surface design thereon, and said core being an expanded and heat-cured foam type plastic.

12. A method of fabricating panels with foamed-in-place cores, the steps thereof comprising: assembling a stiff frame outline of said panel with an open vent therethrough; adhering marginal edges of a durable and relatively thin surface skin at one side of said frame; lining an inside length of said frame with a strip of gas pervious material at a position in communication with said vent; applying a predetermined quantity of uncured plastic expandable foam type filler on the inside of said skin within said frame; adhering marginal edges of a second durable and relatively thin surface skin at the opposite side of said frame to enclose said strip and filler within the interior of said panel; and curing said filler to expand and fill said interior with a low density core of relatively rigid foam laminated to said frame and skins, excess gas there formed to escape through said strip along said frame and out said vent during the curing of said filler to avoid the formation of air pockets or voids in the cured core.

13. A method in accordance with claim 12, including the step of confining said panel between mold plates to maintain said frame and skins at desired dispositions during formation of said core.

14. A method in accordance with claim 13, wherein said mold plates are canted slightly to present said vent at an elevated position.

15. A method in accordance with claim 14, wherein said panel is rectangular with a vent at each corner thereof, said mold plates retaining the longitudinal lengths thereof level and the transverse lengths thereof canted to present two vents at elevated positions.

16. A method in accordance with claim 15 including the steps of first molding one of said surface skins to provide an embossed surface design thereon, the respective mold plate thereof having surface contours conformed generally thereto, and then preheating both surface skins for a slight expansion thereof, said curing of said core being by application of heat to the assembled panel within said mold parts.

17. A method in accordance with claim 16, wherein said step of applying uncured filler is characterized by a placement in a row with a single pass of said filler along a longitudinal length of said panel below the longitudinal centerline thereof, said filler to expand upward toward said elevated vents.

18. A method in accordance with claim 17, wherein said transverse lengths of said panel are canted at approximately 10 degrees to the horizontal, said row being placed in the deep portions of said design.

References Cited

UNITED STATES PATENTS

| 3,122,860 | 3/1964 | Schulze | 52—309 |
| 3,141,206 | 7/1964 | Stephens | 52—615 |
| 3,147,336 | 9/1964 | Matthews | 52—615 |

FOREIGN PATENTS 754,299  1956  Great Britain.

JOHN E. MURTAGH, Primary Examiner.